United States Patent
Paul et al.

(10) Patent No.: US 11,351,839 B2
(45) Date of Patent: Jun. 7, 2022

(54) SOUND INSULATION ARRANGEMENT FOR AN AIR-CONDITIONING SYSTEM OF A MOTOR VEHICLE

(71) Applicant: Mahle International GmbH, Stuttgart (DE)

(72) Inventors: Michael Paul, Sachsenheim (DE); Erik Person, Stuttgart (DE); Norman Schaake, Markgroeningen (DE)

(73) Assignee: Mahle International GmbH

( * ) Notice: Subject to any disclaimer, the term of this patent is extended or adjusted under 35 U.S.C. 154(b) by 656 days.

(21) Appl. No.: 16/016,247

(22) Filed: Jun. 22, 2018

(65) Prior Publication Data

US 2018/0370325 A1    Dec. 27, 2018

(30) Foreign Application Priority Data

Jun. 22, 2017    (DE) .......................... 102017210562.3

(51) Int. Cl.
*B60H 1/00* (2006.01)
*F24F 13/24* (2006.01)

(52) U.S. Cl.
CPC ..... *B60H 1/00564* (2013.01); *B60H 1/00514* (2013.01); *B60H 2001/006* (2013.01); *F24F 13/24* (2013.01); *F24F 2013/242* (2013.01)

(58) Field of Classification Search
CPC .. F24F 13/0263; F24F 2013/242; F24F 13/24; B60H 2001/006; B50H 1/00564
See application file for complete search history.

(56) References Cited

U.S. PATENT DOCUMENTS

| | | | | |
|---|---|---|---|---|
| 3,819,244 A | * | 6/1974 | Paulick | F24F 1/02 312/101 |
| 5,975,146 A | * | 11/1999 | Lardillat | F16L 59/147 138/149 |
| 6,178,764 B1 | | 1/2001 | Tanaka et al. | |
| 2011/0300334 A1 | * | 12/2011 | Ueno | D04H 1/74 428/141 |
| 2015/0204573 A1 | * | 7/2015 | Gray | B32B 37/14 428/43 |
| 2016/0118034 A1 | * | 4/2016 | Qian | G10K 11/168 181/290 |

FOREIGN PATENT DOCUMENTS

| | | |
|---|---|---|
| DE | 10 2005 027 566 A1 | 1/2006 |
| DE | 102006057823 A1 | 6/2008 |
| DE | 10 2009 032 597 A1 | 1/2011 |
| DE | 10 2011 008 518 A1 | 7/2012 |

OTHER PUBLICATIONS

English abstract for DE-10 2005 027 566.
English abstract for DE-10 2006 057 823.
English abstract fro DE-10 2009 032 597.
English abstract for DE-10 2011 008 518.

* cited by examiner

*Primary Examiner* — Brian M King
(74) *Attorney, Agent, or Firm* — Fishman Stewart PLLC

(57) ABSTRACT

A sound insulation arrangement for an air-conditioning system may include a gas-tight housing and a sound insulation element. The housing may include an air inlet and an air outlet. The sound insulation element may be composed of an insulation material and may be fixed in the housing. The sound insulation element may have an inlet side disposed about the air inlet and an outlet side disposed about the air outlet such that the sound insulation element defines an air conduit in the housing.

19 Claims, 2 Drawing Sheets

SOUND INSULATION ARRANGEMENT FOR AN AIR-CONDITIONING SYSTEM OF A MOTOR VEHICLE

CROSS-REFERENCE TO RELATED APPLICATIONS

This application claims priority to German Patent Application No. DE 10 2017 210 562.3, filed on Jun. 22, 2017, the contents of which are hereby incorporated by reference in its entirety.

TECHNICAL FIELD

The invention relates to a sound installation arrangement for an air-conditioning system of a motor vehicle.

BACKGROUND

In order to improve the ride comfort in a motor vehicle, experts continue to strive for reducing the wind, rolling and engine noises in the interior of motor vehicle. The consequence of the continuous development in this area is that the noises of the air-conditioning system in the interior become increasingly more audible. For reducing the exposure to noise by the air-conditioning system, different solutions are proposed.

In DE 10 2011 008 518 A1 for example, a ventilation duct of the air-conditioning system is described, in which on a lateral wall an acoustic chamber is formed. The acoustic chamber is covered with a sound-insulation material which separates the ventilation duct from the acoustic chamber. According to the description, the exposure to noise created by the air flow in the ventilation duct is reduced by the acoustic chamber.

In DE 10 2006 057 823 A1, a similar acoustic chamber is proposed in a lateral wall of the ventilation duct for solving the described problem. However, the acoustic chamber in this case is filled out with the sound-insulation material.

Disadvantageous with these solutions, however, is that the sound-insulation material can be fixed in the ventilation duct only with major installation effort and the ventilation ducts, because of the installed acoustic chambers, have a design that is complex in the manufacture.

DE 10 2009 032 597 A1 by contrast describes a diffuser module with a diffuser element which increases the flow resistance of the air flow in the ventilation duct. The diffuser element can consist, among other things, of the sound-insulation material so that among other things the exposure to noise by the air-conditioning system can also be reduced. Disadvantageously, this solution results in a pressure drop in the ventilation duct and in an increase of the low frequency components by the swirling of the air flow on the diffuser element.

SUMMARY

The object of the invention therefore is to provide a sound insulation arrangement which overcomes the mentioned disadvantages.

According to the invention, this object is solved through the subject of the independent claim(s). Advantageous embodiments are the subject of the dependent claim(s).

The present invention is based on the general idea of reducing the noise development in the air-conditioning system through a sound-insulating duct. A generic sound insulation arrangement for an air-conditioning system of a motor vehicle comprises a gas-tight housing with an air inlet and with an air outlet, wherein the sound insulation arrangement comprises a sound insulation element consisting of an insulation material that is fixed in the housing. According to the invention, the sound insulation element is fixed with an inlet side about the air inlet and with an outlet side about the air outlet and forms an air conduit in the housing.

According to the invention, the sound insulation element is fixed on the air inlet and on the air outlet and the air conduit located within the housing is formed of the insulation material. Consequently, an air flow flows from the air inlet to the air outlet in the gas-tight housing through the air conduit. The sound insulation element consists of a sound insulation material so that the sound emitted from the air flow is dissipated by friction on the partly gas-permeable insulation material. In this way, the noise development in the air-conditioning system can be significantly reduced. In addition, the air flow is conducted through the air conduit at least almost without resistance, as a result of which the undesirable pressure drop in the sound insulation arrangement is prevented.

In an advantageous further development of the solution according to the invention it is provided that an inlet cross section on the inlet side of the sound insulation element substantially corresponds to an air inlet cross section of the air inlet and an outlet cross section on the outlet side of the sound insulation element substantially corresponds to an air outlet cross section of the air outlet. In the air guiding channel formed by the sound insulation element, an undesirable pressure drop at the air inlet and at the air outlet is prevented in this way. Furthermore, an intermediate space is formed between the sound insulation element and the air-tight housing located outside. In the intermediate space, the sound emitted by the air flow is transmitted through the sound insulation material so that the noise development in the air-conditioning system is further reduced.

Advantageously it is provided, furthermore, that the air inlet cross section of the air inlet is smaller than the air outlet cross section of the air outlet and the inlet cross section of the sound insulation element is smaller than the outlet cross section of the sound insulation element. Here, the inlet cross section substantially corresponds to an air inlet cross section and the outlet cross section substantially corresponds to the air outlet cross section. A duct cross section of the air conduit formed by the sound insulation element increases steadily from the inlet cross section to the outlet cross section. On the air inlet, a two-dimensional cross section jump from a smaller air inlet cross section to a larger duct cross section than occurs. Accordingly, a two-dimension cross section jump from a larger duct cross section to a smaller air outlet cross section is created at the air outlet. As is known, ducts with a deviating cross section also have a deviating characteristic acoustic impedance, so that at the air inlet and at the air outlet a jump of the characteristic acoustic impedance is present in each case. The jump in the characteristic acoustic impedance results in sound reflections at the air inlet and at the air outlet as a result of the sound emission and consequently the noise development in the air-conditioning system are reduced.

In an advantageous further development of the sound insulation element it is provided that the insulation material has a high through-flow resistance. Because of the high through-flow resistance, the air flow through the air conduit formed by the sound insulation element is conducted from the air inlet to the air outlet without a pressure drop. Preferentially, the gas-permeable insulation material is a non-woven fabric. The non-woven fabric is only slight hygroscopic as a result of which an accumulation of dirt and an establishment of bacteria cultures can be advantageously prevented. A sound insulation element of a non-woven fabric can be produced for example by a deep drawing method.

In a particularly advantageous configuration of the sound insulation element, the sound insulation element is fixed on the housing in a form-fit manner preferably by a slot and key connection. A form-fit fixing of the sound insulation element in the housing can be advantageously performed in an effort-reducing manner.

In order to be able to fix the sound insulation element in the housing, it is provided, furthermore, that the sound insulation element comprises a first sound insulation part and a second sound insulation part, which are fixed to one another in a firmly bonded or form-fit manner and form the sound insulation element. The first sound insulation part and the second sound insulation part are parts of the sound insulation element and form the sound insulation element after the fixing together in a firmly bonded or form-fit manner. The characteristics of the two sound insulation elements thus correspond to the characteristics of the sound insulation element. Accordingly, the first sound insulation part and the second sound insulation part can be arranged in the housing one after the other and fixed on the housing and subsequently joined to one another in a form-fit or firmly bonded manner. The housing can then be produced by one piece as a result of which the effort in the manufacture of the sound insulation arrangement is reduced.

In order to further improve the sound reduction in the sound insulation arrangement it is advantageously provided that an intermediate space between the sound insulation element and the housing is at least in regions filled with a sound absorption material. In this way, the sound emitted by the air flow and transmitted into the intermediate space through the sound insulation element is insulated in particular at high frequencies so that the noise development in the air-conditioning system is further reduced. Preferentially, the sound absorption material is a foam material.

It is provided, furthermore, that the housing comprises at least one ventilation opening through which the sound insulation element and the sound absorption material can be ventilated. In particular in a moist environment, an accumulation of dirt and a development of bacterial cultures on the sound insulation material and of the sound absorption material can thus be prevented. Advantageously, at least one drain opening can also be provided through which the water condensed in the gas-tight housing can drain. The drain opening is practically arranged on the housing in such a manner that the draining is possible under the effect of the force of gravity without additional installations.

Altogether, a significant sound reduction can be achieved in the sound insulation arrangement according to the invention and the noise development in the air air-conditioning system reduced.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
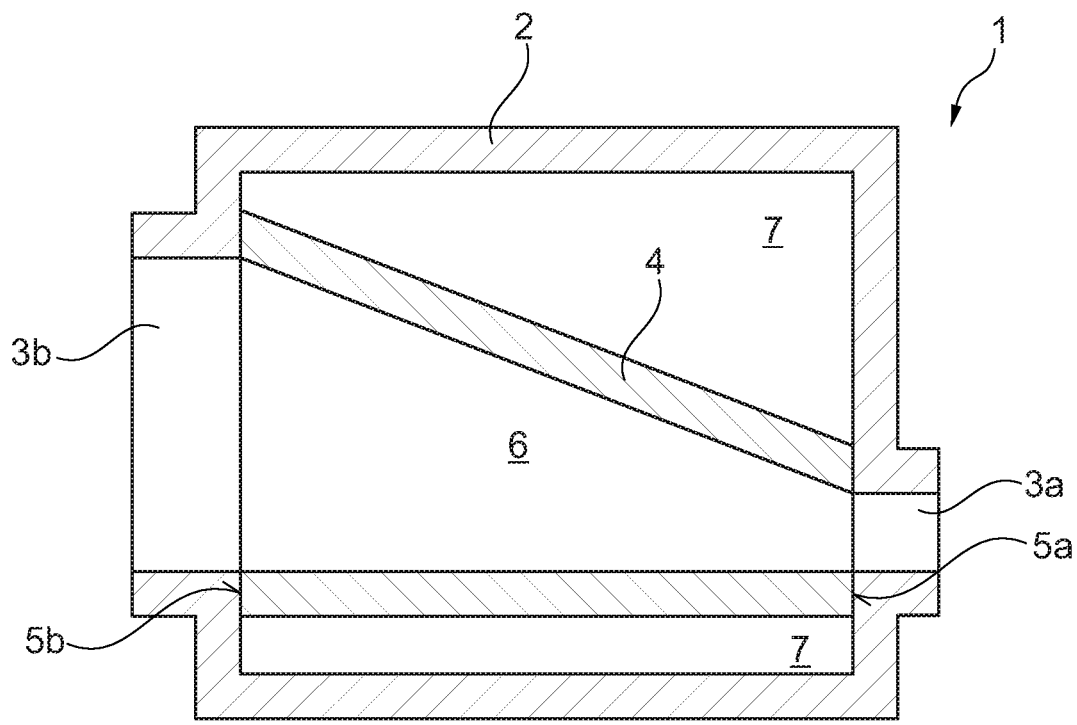
FIG. 1 a lateral sectional view of a sound insulation arrangement according to the invention.
Figure 2:
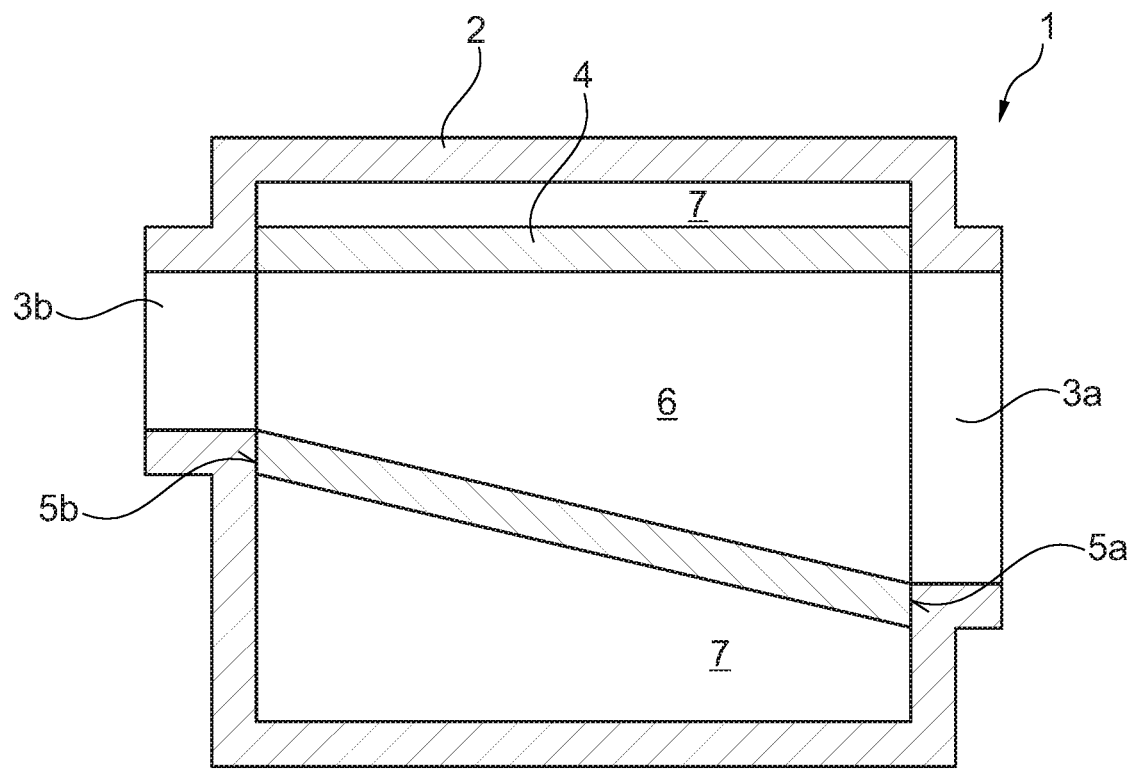
FIG. 2 a sectional view of the sound insulation arrangement shown in FIG. 1 from above.

FIG. 1 and FIG. 2 show sectional views of a sound insulation arrangement 1 according to the invention from one of the sides and from above. The sound insulation arrangement 1 comprises a gas-tight housing 2 in the form of a two-dimensional collision diffuser with an air inlet 3a and with an air outlet 3b. Furthermore, the sound insulation arrangement 1 comprises a sound insulation element 4 made of an insulation material—for example a non-woven fabric—fixed in the housing 2. The sound insulation element 4 is fixed with an inlet side 5a about the air inlet 3a and with an outlet side 5b about the air outlet 3b. By way of the sound insulation element 4, an air conduit 6 is formed in the housing 2. An air flow flows from the air inlet 3a to the air outlet 3b through the air conduit 6 and the sound emitted by the air flow is dissipated on the sound insulation element 4 by friction. The air flow is conducted through the air conduit 6 without resistance as a result of which the undesirable pressure drop in the sound insulation arrangement 1 is advantageously prevented. In addition, the pressure drop in the air conduit 6 can be further reduced by a high through-flow resistance of the insulation material.

The sound insulation element 4 is fixed about the air inlet 3a and about the air outlet 3b, wherein an inlet cross section of the sound insulation element 4 on the inlet side 5a substantially corresponds to an air inlet cross section of the air inlet 3a and an outlet cross section of the sound insulation element 4 on the outlet side 5b substantially corresponds to an air outlet cross section of the air outlet 3b. Here, the air inlet 3a corresponds to a rectangular horizontal shape, while the air outlet 3b corresponds to a rectangular upright shape, so that in the housing 2 an air conduit 6 that is twisted by 90° materialises. The sound insulation element 4 is configured in such a manner that at the air inlet 3a and at the air outlet 3b a two-dimensional cross section jump is created in each case. The respective cross section jump results in a jump of the characteristic acoustic impedance as a result of which sound reflections at the air inlet 3a and at the air outlet 3b materialise. The sound reflections reduce the sound emission in the sound insulation arrangement 1 so that advantageously the noise development in the air-conditioning system is reduced.

Between the sound insulation element 4 and the air-tight housing 2 located outside an intermediate space 7 is formed. In the intermediate space 7, the sound emitted by the air flow is transmitted through the sound insulation element 4 so that the noise development in the air-conditioning system is further reduced.

Figure 3:
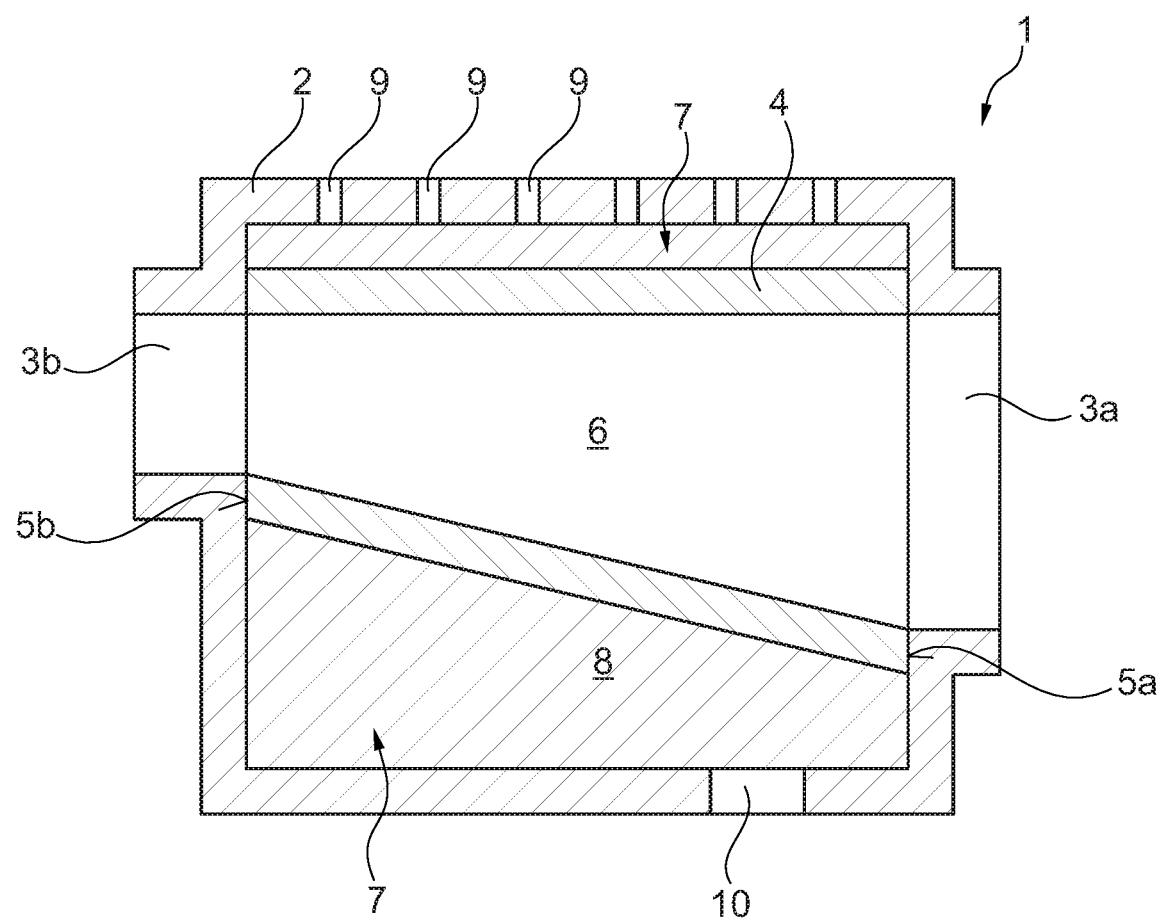
FIG. 3 a sectional view of a sound insulation arrangement with a sound absorption material from above.

FIG. 3 shows a sectional view of a sound insulation arrangement with a sound absorption material 8 from above. Here, the intermediate space 7 between the sound insulation element 4 and the housing 2 is completely filled out with the sound absorption material 8—for example a foam material. The sound emitted by the air flow and transmitted into the intermediate space 7 through the sound insulation element 4 can be advantageously insulated through the sound absorption material 8 in particular at high frequencies. In order to prevent an accumulation of dirt and a development of bacterial cultures on the sound insulation element 4 and on the sound absorption material 8, multiple ventilation openings 9 penetrating the housing 2 and a drain opening 10 are arranged in the housing 2. By way of the ventilation openings 9, the sound insulation element 4 and the sound absorption material 8 are ventilated and the water condensed in the gas-tight housing 2 can drain through the drain opening 10.

Figure 4:
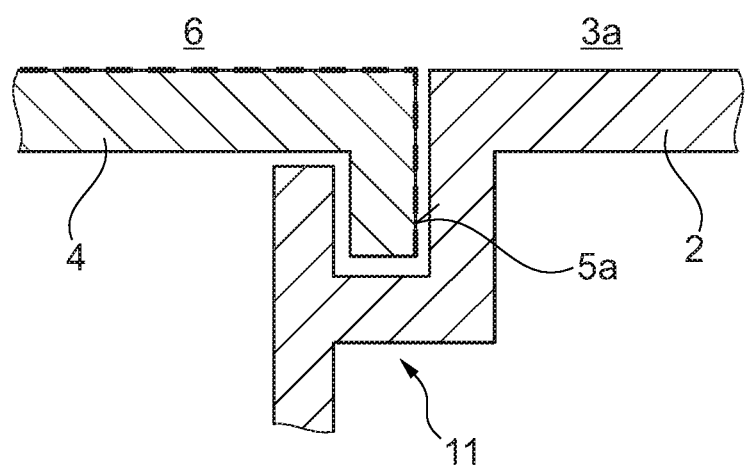
FIG. 4 a sectional view of a sound insulation element fixed on a housing by a slot and key connection.

In FIG. 4, a sectional view of the sound insulation element 4 is shown, which is fixed on the housing 2 by a slot and key connection 11. Fixing the sound insulation element 4 in the housing 2 can be performed in an effort-reduced manner by way of the slot and key connection 11.

Altogether, a significant sound reduction can be achieved in the sound insulation arrangement 1 according to the invention and the noise development in the air-conditioning system reduced.

The invention claimed is:

1. A sound insulation arrangement for an air-conditioning system of a motor vehicle, comprising:
 a gas-tight housing including an air inlet and an air outlet; and
 a sound insulation element composed of an insulation material and fixed in the housing;
 wherein the sound insulation element has an inlet side disposed about the air inlet and an outlet side disposed about the air outlet such that the sound insulation element defines an air conduit in the housing; and
 wherein a cross section of the air conduit has an area that steadily increases from the inlet side of the sound insulation element to the outlet side of the sound insulation element.

2. The sound insulation arrangement according to claim 1, wherein an inlet cross section of the sound insulation element on the inlet side substantially corresponds to an air inlet cross section of the air inlet and an outlet cross section of the sound insulation element on the outlet side substantially corresponds to an air outlet cross section of the air outlet.

3. The sound insulation arrangement according to claim 2, wherein the air inlet cross section of the air inlet is smaller than the air outlet cross section of the air outlet and wherein the inlet cross section of the sound insulation element is smaller than the outlet cross section of the sound insulation element.

4. The sound insulation arrangement according to claim 1, wherein the insulating material has a through-flow resistance that, relative to another insulating material having a lower through-flow resistance, reduces an undesirable pressure drop in an air flow that is conductable through the air duct from the air inlet to the air outlet.

5. The sound insulation arrangement according to claim 1, wherein the insulation material is a non-woven fabric.

6. The sound insulation arrangement according to claim 5, wherein the sound insulation element is a deep-drawn sound insulation element.

7. The sound insulation arrangement according to claim 1, wherein the sound insulation element is fixed to the housing in a form-fit manner.

8. The sound insulation arrangement according to claim 1, wherein the sound insulation element includes a first sound insulation part and a second sound insulation part fixed to one another in at least one of a firmly bonded manner and a form-fit manner, the first sound insulation part and the second sound insulation part defining the sound insulation element.

9. The sound insulation arrangement according to claim 1, further comprising an intermediate space defined between the sound insulation element and the housing, wherein at least a region of the intermediate space is filled with a sound absorption material.

10. The sound insulation arrangement according to claim 1, wherein the housing further includes at least one of i) at least one ventilation opening and ii) at least one drain opening.

11. The sound insulation arrangement according to claim 7, wherein the sound insulation element is fixed to the housing via a slot and key connection.

12. The sound insulation arrangement according to claim 9, wherein the sound absorption material is a foam material.

13. The sound insulation arrangement according to claim 1, wherein at least one of i) an inlet cross section of the sound insulation element on the inlet side substantially corresponds to an air inlet cross section of the air inlet and ii) an outlet cross section of the sound insulation element on the outlet side substantially corresponds to an air outlet cross section of the air outlet.

14. A sound insulation arrangement for an air-conditioning system, comprising:
 a gas-tight housing including an air inlet and an air outlet;
 a sound insulation element having an inlet side and an outlet side, the sound insulation element composed of an insulation material and defined by a first sound insulation part and a second sound insulation part fixed to one another in at least one of a firmly bounded manner and a form-fit manner;
 the sound insulation element arranged within the housing and coupled to the air inlet on the inlet side and coupled to the air outlet on the outlet side such that the sound insulation element provides an air conduit between the air inlet and air outlet; and
 a sound absorption material disposed within an intermediate space defined between the sound insulation element and the housing;
 wherein the air inlet has a rectangular horizontal shape; and
 wherein the air outlet has a rectangular upright shape having a longitudinal extent that extends transversely to a longitudinal extent of the rectangular horizontal shape.

15. The sound insulation arrangement according to claim 14, wherein the insulating material has a through-flow resistance that, relative to another insulating material having a lower through-flow resistance, reduces an undesirable pressure drop in an air flow that is conductable through the air duct from the air inlet to the air outlet.

16. A sound insulation arrangement for an air-conditioning system, comprising:
 a gas-tight housing including an air inlet, an air outlet, and at least one of i) at least one ventilation opening and ii) at least one drain opening;
 a sound insulation element composed of an insulation material and arranged within the housing;
 wherein an inlet side of the sound insulation element is coupled to the air inlet and an outlet side of the sound insulation element is coupled to the air outlet such that the sound insulation element defines an air conduit between the air inlet and the air outlet through which an air flow is flowable;

wherein the insulating material has a through-flow resistance that, relative to another insulating material having a lower through-flow resistance, reduces an undesirable pressure drop in the air flow conducted through the air conduit; and wherein a cross section of the air conduit has an area that steadily increases from the inlet side of the sound insulation element to the outlet side of the sound insulation element.

17. The sound insulation arrangement according to claim 1, wherein:

the air inlet has a rectangular horizontal shape; and the air outlet has a rectangular upright shape having a longitudinal extent that extends transversely to a longitudinal extent of the rectangular horizontal shape.

18. The sound insulation arrangement according to claim 17, wherein the air conduit has a rectangular cross section and is twisted such that (i) a cross section of the sound insulation element on the inlet side substantially corresponds to an air inlet cross section of the air inlet and (ii) the cross section of the sound insulation element on the outlet side substantially corresponds to an air outlet cross section of the air outlet.

19. The sound insulation arrangement according to claim 18, wherein the air conduit is twisted by approximately 90° between the inlet side of the sound insulation element and the outlet side of the sound insulation element.

* * * * *